July 7, 1959  J. R. KREBS  2,893,849
FLUIDIZED SOLIDS CONTACTING APPARATUS
Filed May 1, 1956
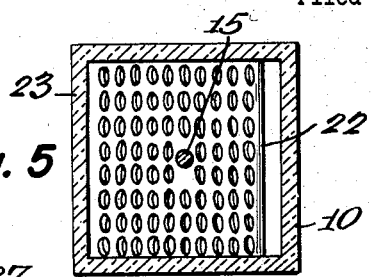
Fig. 5
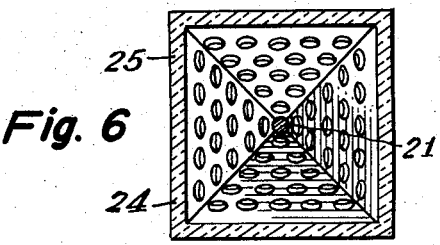
Fig. 6
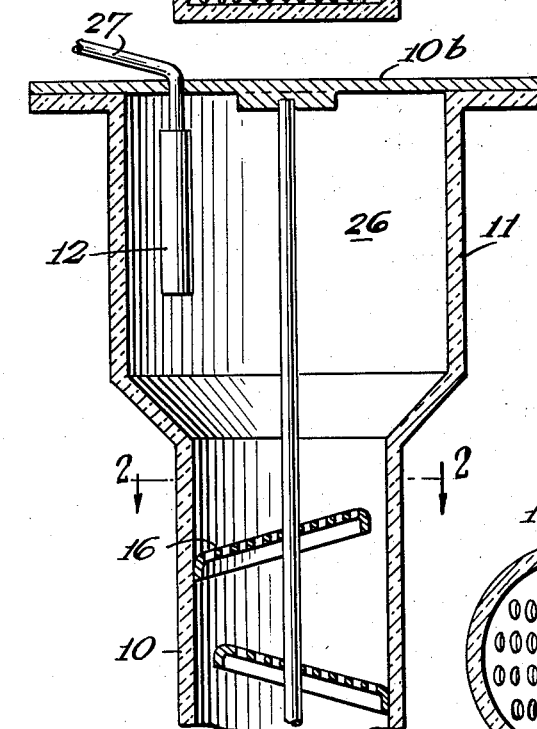
Fig. 1
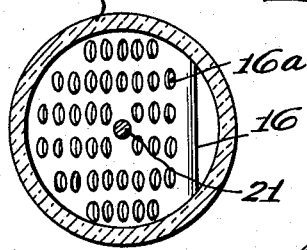
Fig. 2
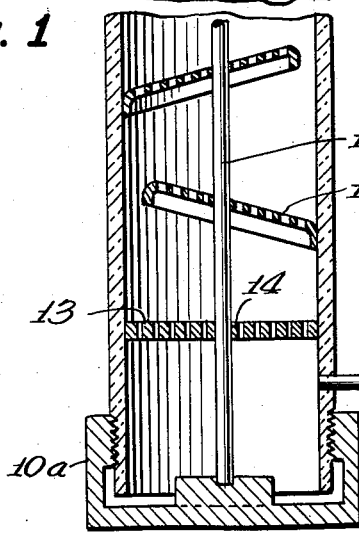
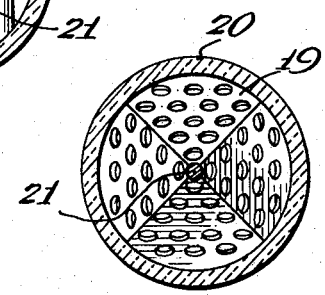
Fig. 3
Fig. 4
INVENTOR.
John Robert Krebs
BY Everett A. Johnson
ATTORNEY

United States Patent Office 2,893,849
Patented July 7, 1959

2,893,849

FLUIDIZED SOLIDS CONTACTING APPARATUS

John R. Krebs, Indianapolis, Ind., assignor to Standard Oil Company, Chicago, Ill., a corporation of Indiana Application May 1, 1956, Serial No. 582,028

5 Claims. (Cl. 23—284)

This invention relates to the catalytic treatment of gasiform fluids in the presence of powdered solid catalyst wherein the finely divided particles of catalyst are fluidized in an upflow of gasiform fluids. More particularly, the invention relates to the design of contacting apparatus which, when used with finely divided fluidized solids, promotes a more uniform quality of fluidization than otherwise obtainable.

When gas is introduced under pressure at the base of a vertical bed of finely divided solids, it will flow through the bed in a manner which is roughly dependent upon the superficial gas velocity (volume of gas per unit time divided by the bed cross-sectional area). At low gas velocities, the fluidizing gasiform fluid flows through the interstitial passages of the mass of finely divided solids without a noticeable change in bed appearance. At higher fluid velocities, there is a marked expansion of the bed characterized by a rise in the solids level within the contacting vessel. The top surface or level of the bed may become quite turbulent and frequently gives the appearance of a boiling liquid. Regions of low catalyst density or concentration develop within the bed and these relatively dilute masses move toward the top of the bed and may be of such expanse as to span or bridge the bed in which case the dilute mass propagates upwardly to produce a condition referred to as channeling or slugging. During such condition, the gasiform fluid tends to pass through the fluidized solids in large bubbles and the gases substantially by-pass the solids which are in a settled condition. Such situations make for poor contact with the finely divided solids.

For example, it has been found in the synthesis reaction of carbon monoxide and hydrogen in the presence of finely divided iron mill scale that conversion efficiency is decreased as the diameter of the fluidized bed increases. Large volumes of gas apparently rise to the surface of the fluidized bed as bubbles or slugs without suitably contacting the catalyst particles. This results in lower reaction efficiencies and considerable variation in the quality or degree of fluidization effect across a fluidized bed. I have found that by use of the equipment described herein that a more uniform degree of fluidization can be obtained thereby to insure a more efficient conversion to the desired product.

When a number of upwardly inclined perforated baffles are disposed vertically within a contacting vessel, the formation of gas or fluid bubbles is prevented due to the collapse of the bubbles in passing upwardly within the contacting vessel. The number, and the cross-sectional area, of the baffles required in any particular treating system depend, to some extent, upon the factors which are important to fluidizing the original materials but also depend upon the dimensions of the treating vessel.

In accordance with the invention, a contacting zone is provided to which the gasiform fluids are introduced at a relatively low inlet point and pass upwardly, thereby aerating or suspending the finely divided solids in a fluidized phase. At vertically spaced points throughout the contacting chamber, the upflowing fluids are repeatedly subdivided by means of the inclined and perforated grids. Intermediate these spaced grids are regions of substantial vertical height wherein the gasiform fluids are free to move upwardly through the fluidized solids without constraint.

Of the many basic design types, the confined or captive fluidized bed is adaptable to both catalyst testing and to commercial processing units. It is with respect to such a system that my invention will be described.

The grids, having inclined surfaces but extending generally transverse to the direction of flow of gasiform fluids through the contacting chamber, effect a substantially uniform distribution of the gasiform fluids and solids suspended therein so that there is little tendency to the formation of bubbles within the mass. Furthermore, the system causes the substantially disruption of any large bubbles of gasiform fluid and of any conglomerate of solids which may form.

These advantages are obtained by passing the gasiform fluids upwardly through the inclined perforated grids and the invention contemplates the recurrent and random jetting of gasiform fluids upwardly through the spaced grids whereby optimum contact of the gasiform fluids is made with the fluidized solids maintained between the vertically spaced perforated grids.

The advantages of my invention and the design features thereof will be described in more detail by reference to preferred embodiments thereof illustrated in the accompanying drawings wherein:

Figure 1 is a schematic elevation of a contacting vessel;

Figure 2 is a section taken along the line 2—2 in Figure 1;

Figure 3 is a fragmentary elevation of another embodiment of the invention;

Figure 4 is a section taken along the line 4—4 in Figure 3; and

Figures 5 and 6 illustrate other embodiments of my invention wherein the vessel and the baffles are of a generally rectangular shape.

Referring to Figure 1, I have illustrated a contacting unit embodying a cylindrical vessel 10 with a superposed catalyst separation chamber 11 which may be provided with a filter means 12. A gasiform fluid distributor 13 extends across the flow area of the contacting chamber 10 and is provided with a bore 14 through which the mounting shaft 15 for the baffles 16 passes. The fluidizing gas is supplied by valved line 17 through the meter 18 into the contacting chamber 10 through the flow distributor 13.

Inclined perforated plate baffles 16 are longitudinally spaced on rod 15 at vertical spacings of about ½ to ⅔ the diameter of the vessel 10. The use of such arrangement of perforated baffles 16 in the tubular contactor 10 improves fluidization and gas-solid contacting without any apparent decrease in the catalyst turnover or top-to-bottom mixing within the contactor 10.

The perforated plate baffles 16 may comprise woven wire, expanded metal, or punched sheets. The perforations in the baffles 16 may be from about 0.125 inch on 0.1875 inch centers to about ⁵⁄₁₆ inch in diameter on ¼ inch centers giving approximately 50% open flow area.

In Figure 3, I have shown a form of baffle which comprises a pyramid 19 extending across the entire flow area of the contactor 10a. As in the embodiment illustrated in Figure 1, the grids 20 are carried by a shaft 21 which is fixed at its upper and lower ends in a manner similar to that shown in Figure 1. However, other means such as wall supports may be provided for supporting the individual baffles.

In Figure 5, the baffle 22 comprises a rectangular plate within a column 23 of rectangular cross-sectional area and, in Figure 6, the pyramid 24 has a rectangular base which conforms with the inner wall of the column 25. The arrangement and operation of baffles 22 and 24 in vessels 23 and 25, respectively, are similar to that described for the embodiments of Figures 1 to 4.

The linear rate of gas flow through the contactor 10 is that which is appropriate to maintain the desired condition of fluidization. Usually, for powdered catalysts, this involves a vertical upward linear velocity of about 0.5 to about 3 feet per second. The apparatus is preferably operated so as to raise the level of the fluidized solids phase to a point above the topmost baffle 16 within the contactor 10. The product gases are withdrawn by way of a cyclone separator or filter 12 in the solids-disengaging space 26 superposing the upper end of the vessel 10. From the separator or filter 12, the effluent gases emerge through outlet conduit 27 and may be processed as desired.

The improved gas-fluid contacting efficiency also permits equal or greater concentrations at higher space velocities and, accordingly, good fluidization can be continued over longer operating periods without sacrificing conversions.

From the above, it is apparent that the present invention assures uniformity of fluidization of finely divided solids and, although I have described my invention by reference to separate embodiments thereof, it should be understood that this is by way of illustration only. Further, it is contemplated that modifications therein and the mode of operation can be made by those skilled in the art in view of my description without departing from the spirit and scope of the invention.

What I claim is:

1. An apparatus for effecting uniform, non-slugging, intimate contact between gasiform fluid and finely divided solids suspended therein comprising a vertically elongated chamber, first conduit means discharging into the lower portion of said chamber, second conduit means in fluid communication with the upper portion of said chamber, a plurality of perforated baffles extending upwardly and transverse to the vertical axis of said chamber, said baffles extending across substantially the full flow area of said chamber and having uniform interstices to provide a great number of fluid jets above each upwardly transverse baffle, whereby slugging is avoided and uniform contact between solids and gasiform fluid is obtained, said baffles comprising pyramidal units having converging planar surfaces, the perimeter of each unit being in contact with the wall of said chamber.

2. An apparatus for effecting uniform, non-slugging, intimate contact between gasiform fluid and finely divided solids suspendable therein, comprising a vertically elongated chamber, first conduit means discharging into the lower portion of said chamber, second conduit means in fluid communication with the upper portion of said chamber, and a plurality of fixed, vertically-spaced upwardly inclined baffle members, the peripheral edges thereof contacting the walls of said chamber and extending upwardly and inwardly therefrom, said baffle members comprising perforated units cooperating with the walls of said chamber to define sub-chambers thereabove and provide a large number of fluid jets discharging above each baffle member into such sub-chambers.

3. The apparatus of claim 2 wherein said members are planar elliptic plates, each having an upper chordal edge, alternate baffle members being symmetrically arranged in opposition to each other and having curved peripheral edges in contact with the walls of said chamber.

4. The apparatus of claim 2 wherein the baffle members are secured to a longitudinally disposed supporting shaft means.

5. The apparatus of claim 2 wherein the baffle members comprise perforated cones extending across the full flow area of the chamber.

References Cited in the file of this patent

UNITED STATES PATENTS

| | | |
|---|---|---|
| 2,541,186 | Anderson | Feb. 13, 1951 |
| 2,581,134 | Odell | Jan. 1, 1952 |
| 2,606,104 | Hogan | Aug. 5, 1952 |
| 2,635,949 | Fenske | Apr. 21, 1953 |
| 2,685,498 | Dickenson | Aug. 3, 1954 |
| 2,740,696 | Longwell | Apr. 3, 1956 |